US005139674A

United States Patent [19]

Abo

[11] Patent Number: 5,139,674

[45] Date of Patent: Aug. 18, 1992

[54] METHOD OF PURIFYING DRY-CLEANING SOLVENT

[75] Inventor: Masanobu Abo, Chiba, Japan

[73] Assignee: Novo Nordisk A/S, Bagsvaerd, Denmark

[21] Appl. No.: 571,608

[22] PCT Filed: Dec. 22, 1989

[86] PCT No.: PCT/DK89/00308

§ 371 Date: Sep. 5, 1990

§ 102(e) Date: Sep. 5, 1990

[87] PCT Pub. No.: WO90/07606

PCT Pub. Date: Jul. 12, 1990

[30] Foreign Application Priority Data

Dec. 23, 1988 [JP] Japan ............ 63-323789

[51] Int. Cl.[5] ............ D06L 1/10; C02F 1/28

[52] U.S. Cl. ............ 210/632; 435/176; 435/288; 8/142; 210/663

[58] Field of Search ............ 210/606, 632, 660, 663, 210/694, 765; 435/134, 135, 176-181, 195-198, 288; 8/142

[56] References Cited

U.S. PATENT DOCUMENTS

| | | | |
|---|---|---|---|
| 3,619,120 | 11/1971 | Conlisk et al. | 210/660 |
| 3,705,084 | 12/1972 | Reynolds | 435/288 |
| 3,776,693 | 12/1973 | Smith et al. | 435/196 |
| 3,809,613 | 5/1974 | Vieth et al. | 435/288 |
| 4,119,494 | 10/1978 | Durand et al. | 435/176 |
| 4,193,765 | 3/1980 | Jackson | 210/765 |
| 4,312,633 | 1/1982 | Kazama et al. | 8/142 |
| 4,645,741 | 2/1987 | Inada | 435/134 |
| 4,855,233 | 8/1989 | Gancet et al. | 435/134 |

*Primary Examiner*—Thomas Wyse

*Attorney, Agent, or Firm*—Steve T. Zelson; Elias J. Lambiris

[57] ABSTRACT

Contaminants containing non-polar neutral lipid are removed from a solvent that has been used for dry cleaning by placing used solvent in contact with a lipase, which is stable and exhibits an activity in the solvent, or with an immobilized product of said lipase, and with an adsorbent.

9 Claims, 1 Drawing Sheet

METHOD OF PURIFYING DRY-CLEANING SOLVENT

TECHNICAL FIELD

The present invention relates to a method of removing contaminants, especially neutral lipid contaminants, from a solvent which has been used for dry cleaning, by using a lipase.

BACKGROUND ART

Solvents used for dry cleaning are commonly re-used after removal of contaminants by filtration and adsorption. However, non-polar neutral lipid contaminants are poorly adsorbed and are highly soluble in the solvent, and they are therefore difficult to remove.

It is the purpose of the present invention to provide a purification method that can readily remove contaminants containing non-polar neutral lipid from a solvent that has been used for dry cleaning.

STATEMENT OF THE INVENTION

The above-mentioned problem is solved by a purification method characterized by placing used solvent in contact with a lipase, which is stable and exhibits an activity in the solvent, or with an immobilized product of said lipase, and with an adsorbent.

DETAILED DESCRIPTION OF THE INVENTION

Figure 1:
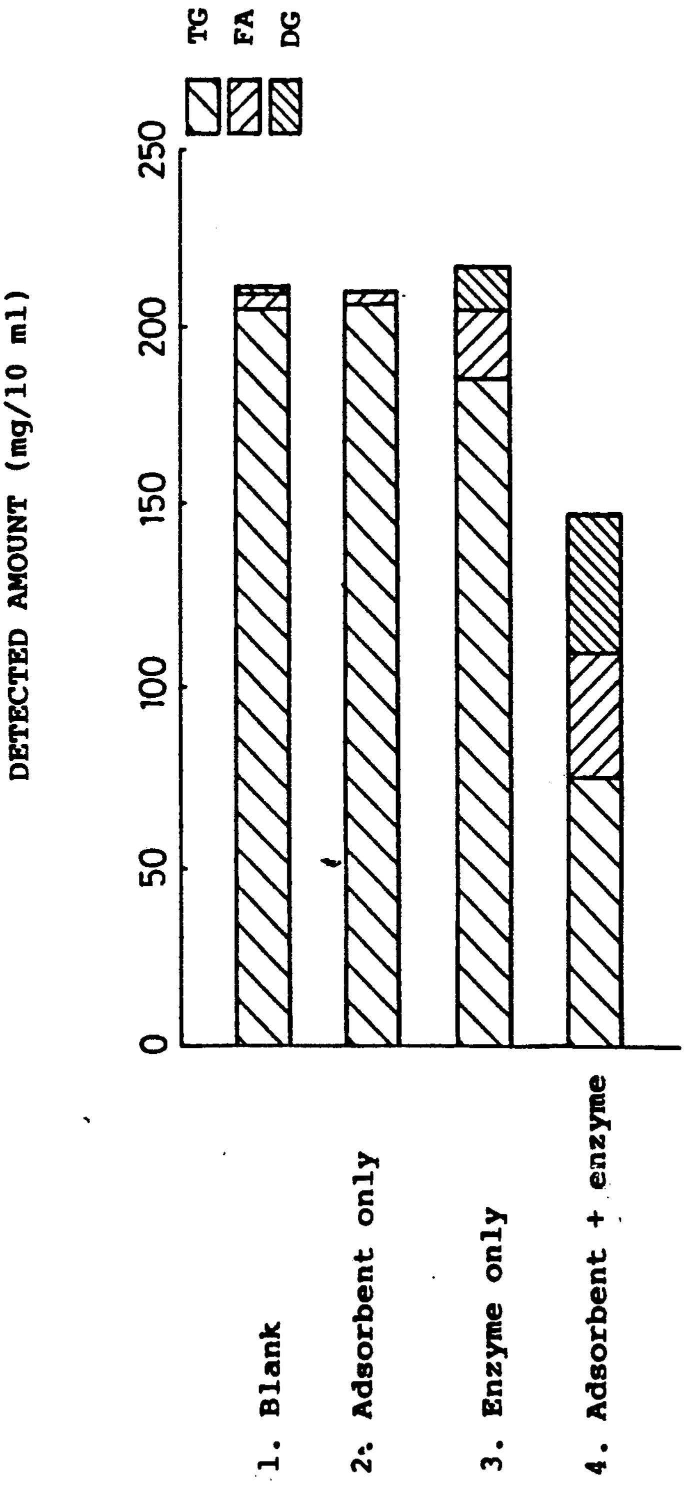

Lipase produced by a microorganism belonging to the genus Candida, Humicola, Pseudomonas or Mucor or lipases produced by a transformant obtained by inserting the structural gene for said lipase into another microorganism can be used advantageously.

Generally, enzymes do not show their activities in organic solvents because they undergo denaturation. However, it was surprisingly found that some lipases show activity even in dry cleaning solvents For example, lipases derived from *Candida antarctica, Humicola lanuoinosa* and *Pseudomonas fluorescens* show activity even in dry cleaning solvents. The present invention is based on this discovery. Neutral lipid contaminants dissolved in solvents are decomposed by lipases and the resulting fatty acid and glyceride products are easily adsorbed on the adsorbents.

The lipase can be added in the form of an aqueous solution to the solvents used for dry cleaning, but may possibly recontaminate the clothes to be cleaned Consequently, it is desirable to use the lipase in the form of immobilized lipase. Any known method can be used for the immobilization of the lipase. For example, the immobilization can be done by gel entrapment e.g. in polyacrylamide or alginate, by adsorption e.g. on silica or alumina, by crosslinking with glutaraldehyde, or by adsorption on ion exchange resin. (The details for the immobilization are described, for example, in "Immobilized enzymes" written by Dr. Ichiro Chibata, published in 1975 by Kodansha Ltd.).

The contact between immobilized lipase and solvent is conveniently effected by use of a cartridge wherein the immobilized lipase is retained, while the solvent is allowed to flow through. Optionally, the cartridge may contain an adsorbent together with the immobilized lipase. Filter paper, filter cloth or other porous sheet material may be used to retain the immobilized lipase. The cartridge may allow the solvent to be pumped through; e.g. it may be cylindrical and have an inner tube and an outer, annular speace for solvent inlet and outlet. Or the cartridge may consist of a bag of porous material containing the immobilized lipase (and, optionally adsorbent), suited for dropping into a solvent tank.

The lipase may be a lipase produced by the original microorganism, or it may be a lipase produced by a transformant produced by inserting the structural gene for a lipase into another microorganism. Said gene transformant can be produced by generally known methods. Details are described, for example, in Idenshi Kogaku (Genetic Engineering), Volume 8 of Biseibutsu-gaku Kiso Koza (Basic Microbiological Seminars), edited by Tadahiko Ando and Kenji Sakaguchi, published in 1987 by Kyoritsu Shuppan Co., Ltd. and in Idenshi Kenkyuho (Genetic Laboratory Methods) II, Volume 1 of ZokuSeikagaku Jikken Koza (Sequel of Biochemical Experiment Seminar), edited by Japan Society of Biochemistry, published in 1986 by K. K. Tokyo Kagaku Dojin.

Some lipases which can be used for the practice of the present invention are commercially available. Some examples of suitable lipases are listed below.

(A) Immobilized Mucor miehei lipase (Lipozyme TM, product of Novo-Nordisk A/S, Denmark).

(B) Lipase derived from *Humicola lanuginosa* (SP-400, product of Novo-Nordisk A/S, Denmark). This lipase is described in the JP-A 63-68697.

(C) Lipase derived from *Candida antarctica*, described in WO 88/02775.

(D) Lipase derived from *Pseudomonas fluorescens* (product of Amano Pharmaceutical Co., Ltd.).

(E) Lipase derived from *Pseudomonas cepacia,* described in JP-A 62-34997, and the immobilized form of this enzyme (product of Novo-Nordisk A/S, Denmark), described in WO 89/01032.

The dry cleaning solvent may be e.g. trichloroethane, tetrachloro-ethylene, a hydrocarbon solvent (e.g. gasoline No. 5) or a fluorinated hydrocarbon (e.g. Freon F-11 or F113). The method of the invention is effective with any of these solvents.

The method for putting the solvent used for dry cleaning into contact with lipase or immobilized lipase and with adsorbent is not specially restricted; the lipase or immobilized lipase can be used in a conventional method for adsorption using adsorbent A particularly advantageous method consists in throwing into a tank with solvent a cartridge in which immobilized lipase alone or in combination with adsorbent is contained in a vessel.

The adsorbents to be used for the present invention are not especially restricted. For example, activated carbon powder and alumina silica gel can be used advantageously.

The amount of lipase or immobilized lipase is preferably within the range of 1-50 weight percent of the solvent, and the amount of adsorbent is preferably within the range of 10-60 weight percent of the solvent. The ratio between the lipase or immobilized lipase and the adsorbent is preferably within the range of 1/1-1/100.

The purification method of the present invention will be explained hereinafter by way of working examples.

EXAMPLE 1

An excess of lipase derived from *Humicola lanuoinosa* (SP 400, a product of Novo-Nordisk A/S) was added to 20 g of porous ceramic (a product of Showa Kogyo Co., Ltd.) in such a manner that it was entirely submerged into the lipase solution and the mixture was left standing overnight so as to adsorb and immobilize the enzyme into the ceramic. The excess enzyme was removed by repeated washing with water and finally the ceramic was washed with ethanol, which was dried in vacuo, by which the immobilized enzyme could be obtained. The moisture content in the immobilized enzyme thus obtained, determined with an infrared hygrometer, was less than 0.5 weight percent. By determination with a synthetic substrate it was found that the activity of the immobilized enzyme was 40.9 units per gram.

The activity of the immobilized enzyme was determined in the following manner. Into 3 ml of 50 mM Tris hydrochloric acid buffer (pH 8.5), 0.45 ml of an ethanolic solution containing 10 mg of immobilized enzyme and 1 mmol of para-nitrophenyl capronate was added, and the increase in the absorbance was determined with a wavelength of 400 nanometer. One unit was defined herein as the amount of enzyme which can release 1 micromol of para-nitrophenol in one minute.

The hydrolysis of olive oil in trichloroethane was conducted using the above-mentioned immobilized enzyme. In this process, water should be supplied in a certain amount because it is one of the substrates involved. For this reason, the immobilized enzyme was hydrated overnight in advance by adding 55 weight percent of water. The test sample used was 10 g of olive oil in 70 ml of trichloroethane, and 10 ml each of the mixture was distributed into 4 test tubes with tight stoppering. Into the test tubes Nos. 3 and 4, one gram each of the immobilized enzyme was added, and the mixtures were each reacted for 19 hours with gentle stirring. The test tubes Nos. 1 and 2 were left standing intact as controls. At 19 hours, 2 g each of a commercial adsorbent for dry cleaning (Alumina silica gel "Sekard", a product of Shinagawa Kasei Co., Ltd., Japan) was added into the test tubes Nos. 2 and 4. And the stirring was further continued for another 3 hours. One ml was collected from each of these test tubes, and 10 ml each of chloroform containing 15 weight percent of lithocolic acid as internal standard was added. The contents of triglycerides (TG), diglycerides (DG) and fatty acids in these test samples were quantitatively assayed with Iatroscan (a product of Iatron Co., Ltd., Japan).

The results were as illustrated in FIG. 1. The number 1 in the chart represents the intact test sample (for comparison), while the numbers 2, 3 and 4 represent the test samples with only adsorbent (for comparison), the sample with only enzyme (for comparison), and the sample treated with both immobilized enzyme and adsorbent (sample according to the present invention), respectively. As clearly seen in FIG. 1, triglycerides cannot be adsorbed at all when only adsorbent is added to the olive oil solution When immobilized enzyme was added, the amounts of diglycerides and fatty acids were found to increase, showing that hydrolysis proceeded. The relatively low reaction rate can possibly be attributed to equilibrium being reached because of the low solubilities of diglycerides and fatty acids (as the reaction products) in trichloroethane. When both adsorbent and immobilized enzyme were used, the reaction products were adsorbed and the equilibrium moved to the side of hydrolysis, so that the hydrolysis remarkably advanced and the lipids in the solvent were remarkably reduced.

As clearly seen from this example, the method claimed by the present invention enables the decomposition of neutral lipids retained in used dry cleaning solvent into fatty acids and diglycerides, and these reaction products can be easily adsorbed on an adsorbent, which can be easily removed. Especially to be noted is that the adsorbent and lipase work with each other in a synergistic manner. More specifically, when the adsorbent and lipase are used together, the reaction products are adsorbed and the equilibrium moves to the side of hydrolysis, whereby the hydrolysis is enhanced and the amount of lipid in the solvent is remarkably reduced.

FIG. 1 illustrates the effects of the method claimed by the present invention (using immobilized lipase and the adsorbent) for removal of neutral lipids.

EXAMPLE 2

Olive oil degradation in trichloro ethylene tried using Lipozyme. Lipozyme was hydrated with 60% water (w/w) overnight. One gram of olive oil was dissolved in 100 ml trichloro ethylene. 20 ml of this solution was taken into each of two flasks. One gram of Lipozyme was added to one flask and 1 g each of Lipozyme and adsorbent were added to the other. The reaction mixture was kept for 24 hours One ml aliquot was taken from the reaction mixture, and 10 ml chloroform containing 0.5% (w/v) lithocholic acid was added as an internal standard. The amount of triglyceride, diglyceride and fatty acid in each sample was analyzed by Iatroscan. The result is shown in the table.

| Sample | TG (mg) | DG (mg) | FA (mg) |
|---|---|---|---|
| | (in 10 ml sample) | | |
| No treatment | 68.4 | 0 | 33.4 |
| Enzyme treatment | 36.4 | 0 | 46.5 |
| Enzyme + adsorbent | 18.1 | 0 | 34.6 |

The reason why the amount of TG was decreased and FA was increased in the enzyme treated sample compared with the non-treated sample is that the anion exchange resin which is used as a carrier of Lipozyme adsorbed some FA produced by hydrolysis Total amount of TG and FA was decreased to approx. 80% compared to the non-treated sample. When adsorbent was added together with enzyme the total amount was reduced to approx. 50%.

EXAMPLE 3

Olive oil degradation in 1,1,2-trichloro-1,2,2trifluoroethane (freon 113) was tried using Lipase P "Amano". One gram of olive oil was dissolved in 50 ml freon 113. One ml of 5% solution of Lipase P "Amano" and 4 g of adsorbent were added to the 20 ml of olive oil/freon 113. The reaction mixture was kept for 16 hours. One ml aliquot was taken from the reaction mixture, and 10 ml chloroform containing 0.5% (w/v) lithocholic acid was added as an internal standard. The amount of triglyceride, diglyceride and fatty acid in each sample was analyzed by Iatroscan. An untreated sample was analyzed in the same way. It was found that TG had completely disappeared after the treatment, and the amount of FA was less than 10% of original amount of TG and FA.

I claim:

1. A method for removing non-polar lipid contaminants from an organic dry cleaning solvent comprising placing the solvent in contact with (a) a lipase which is stable and exhibits an activity in the solvent or an immobilized product of said lipase and (b) an adsorbent.

2. The method according to claim 1, wherein the dry cleaning solvent is trichloroethane, tetrachloroethylene, a hydrocarbon solvent or a fluorinated hydrocarbon.

3. The method according to claim 2, wherein the dry cleaning solvent is gasoline no. 5, Freon F-11 or Freon F-113.

4. The method according to claim 1, wherein the removal of the contaminants is effected by placing the solvent in contact with a cartridge containing the immobilized lipase without the adsorbent and subsequently placing the solvent in contact with the absorbent.

5. The method according to claim 1, wherein the removal of the contaminants is effected by placing the solvent in contact with a cartridge containing both the immobilized lipase and the adsorbent.

6. The method according to claim 1, wherein the lipase is produced by cultivation of a microorganism belonging to the genus Candida, Humicola, Pseudomonas or Mucor or by cultivation of a genetic recombinant of the lipase.

7. The method according to claim 6, wherein the lipase is derived from *Candida antarctica, Humicola lanuginosa* or *Pseudomonas fluorescens.*

8. The method according to claim 1, 6 or 7, wherein the lipase is immobilized by gel entrapment, by adsorption on silica or alumina, by cross-linking with glutaraldehyde or by adsorption on an ion exchange resin.

9. The method according to claim 1, wherein the adsorbent is carbon powder or alumina silica gel.

* * * * *